United States Patent
Maurice et al.

(10) Patent No.: US 11,293,521 B2
(45) Date of Patent: Apr. 5, 2022

(54) QUICK LINK WITH SHUTTER

(71) Applicant: ZEDEL, Crolles (FR)

(72) Inventors: Alain Maurice, Saint Hilaire du Touvet (FR); Marc Jourdan, Saint Martin d'Hères (FR)

(73) Assignee: ZEDEL, Crolles (FR)

( * ) Notice: Subject to any disclaimer, the term of this patent is extended or adjusted under 35 U.S.C. 154(b) by 126 days.

(21) Appl. No.: 16/784,611

(22) Filed: Feb. 7, 2020

(65) Prior Publication Data

US 2020/0256426 A1 Aug. 13, 2020

(30) Foreign Application Priority Data

Feb. 7, 2019 (FR) ........................................ 1901201

(51) Int. Cl.
*F16G 13/14* (2006.01)

(52) U.S. Cl.
CPC ..................... *F16G 13/14* (2013.01)

(58) Field of Classification Search
CPC .......... F16G 13/14; F16B 45/04; F16B 45/00; F16B 45/02; A62B 35/0037; Y10T 29/49947; Y10T 24/45372; B25B 15/007
See application file for complete search history.

(56) References Cited

U.S. PATENT DOCUMENTS

| 1,388,494 A * | 8/1921 | Vala .................... F16B 45/02 294/82.23 |
| 7,698,970 B1 * | 4/2010 | Chavez ................ B25B 15/007 81/124.4 |
| 7,900,430 B1 * | 3/2011 | McCauley .............. F16G 15/04 59/86 |
| 2010/0269314 A1 | 10/2010 | Petzl et al. |
| 2013/0104374 A1 * | 5/2013 | Schlangen .............. F16B 45/02 29/525.01 |
| 2017/0120088 A1 | 5/2017 | Nash |
| 2018/0283439 A1 | 10/2018 | Jones et al. |

FOREIGN PATENT DOCUMENTS

| EP | 2 243 972 A1 | 10/2010 | |
| GB | 2481800 A * | 1/2012 | ............. F16B 45/02 |
| GB | 2481800 A | 1/2012 | |
| JP | 2001-208034 A | 8/2001 | |
| WO | WO-2005073571 A1 * | 8/2005 | ............. F16B 45/02 |
| WO | 2015/132578 A1 | 9/2015 | |

* cited by examiner

*Primary Examiner* — Lee A Holly
(74) *Attorney, Agent, or Firm* — Oliff PLC (57) ABSTRACT

The quick link has a body defining an open link with two opposite ends. The body comprises a straight portion separating two curved portions. A locking ring is fitted rotating and sliding with respect to the body with a closed position closing the link and an open position where the quick link is open. A shutter is fitted removable with respect to the body. The shutter defines an attachment means fixing the shutter to the straight portion and a blocking system fixing the shutter to the locking ring. The attachment means and blocking system are formed by a ring or a hook. The attachment means and blocking system allow rotation of the shutter with respect to the body when the locking ring is in the open position and prevent rotation of the shutter when the locking ring is in the closed position.

11 Claims, 7 Drawing Sheets

QUICK LINK WITH SHUTTER

BACKGROUND OF THE INVENTION

The invention relates to a quick link provided with a removable shutter.

PRIOR ART

In a large number of acrobatic or mountaineering activities, it is commonplace to use a quick link to attach a tool or any other item to a fixed point. The quick link is opened to insert the fixed point inside the ring. The quick link is then re-closed to form an attachment point.

The tool or another useful item of gear is inserted in the ring so that the quick link forms a mechanical connection between the tool and the fixed point. In use, the stresses occurring on the quick link change in intensity and direction. This results in the quick link moving, rotating and flipping. The quick link does not always work along its major axis and/or the different items inserted in the ring come into contact with one another and do not remain in the required position.

In conventional manner, a curved portion of the quick link is in contact with a metallic attachment point whereas the other curved part is in contact with a softer part, for example a textile part such as a rope or strap. If, during the lifetime of the quick link, the latter turns round, the curved portion of the ring which was in contact with the metal part and which has a surface state that has become rough is then in contact with the textile part which may make the textile part wear more quickly.

It becomes apparent from observations of prior art configurations that it is advantageous to secure operation of quick links.

In karabiners, it is known to integrate a blocking part blocking the gate thereby preventing it from opening unintentionally. The document GB 2481800 can be cited in this respect. It is also known from the document WO2015132578 to fit an insert in a shackle to fill the space that exists in the insert thereby preventing any additional connection part from being inserted. Finally, it is known from the document US2018283439 to clip a divider onto a karabiner, the divider circumscribing the inner space of the karabiner to define two attachment areas and prevent the karabiner gate from opening. All these solutions are not transposable to a quick link which has a different operating method.

OBJECT OF THE INVENTION

The object of the invention is to remedy these shortcomings and more particularly to provide a quick link in which the risks of making the quick link work other than along its major axis are reduced.

According to the invention, this object is achieved by a quick link comprising:
  a body defining an open link with opposite first and second ends, the body comprising a central portion separating two curved portions;
  a locking ring fitted rotating and sliding with respect to the body, the locking ring defining a closed position connecting the opposite first and second ends of the body to close the quick link and an open position in which the locking ring is separated from the first end of the body to define an open link with an opening length measured along the sliding axis of the locking ring,
  a shutter fitted removable with respect to the body, the shutter having a first end fixed to the central portion by an attachment means and having an opposite second end collaborating with the locking ring or with the body by means of a blocking system, the attachment means allowing rotation of the shutter with respect to the body, the blocking system collaborating with the body and/or the locking ring to prevent said rotation.

The quick link is remarkable in that:
  the attachment means and the blocking system are formed independently by a ring or a hook,
  the blocking system has a smaller length than the opening length along the sliding axis to allow rotation of the shutter between the locking ring and the first end of the body when the locking ring is in the open position and two blocking members spaced apart from one another to form stops preventing rotation of the shutter when the locking ring is in the closed position.

Preferentially, the blocking system and attachment means are both formed by a ring.

According to a development of the invention, the shutter defines a first ring having a section allowing insertion of the body and preventing insertion of the locking ring and a second ring allowing insertion of the locking ring.

According to a development of the invention, the blocking system and attachment means are both formed by a hook.

Advantageously, the shutter is fitted movable in translation in the sliding direction of the locking ring.

According to a development of the invention, the attachment means partially overlap the locking ring in the sliding direction of the locking ring.

According to another development of the invention, the shutter has a rod directed towards one of the curved portions of the body and salient from the attachment means and the blocking system.

According to a development of the invention, the shutter defines a block stop configured to prevent movement of the locking ring in the sliding direction.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
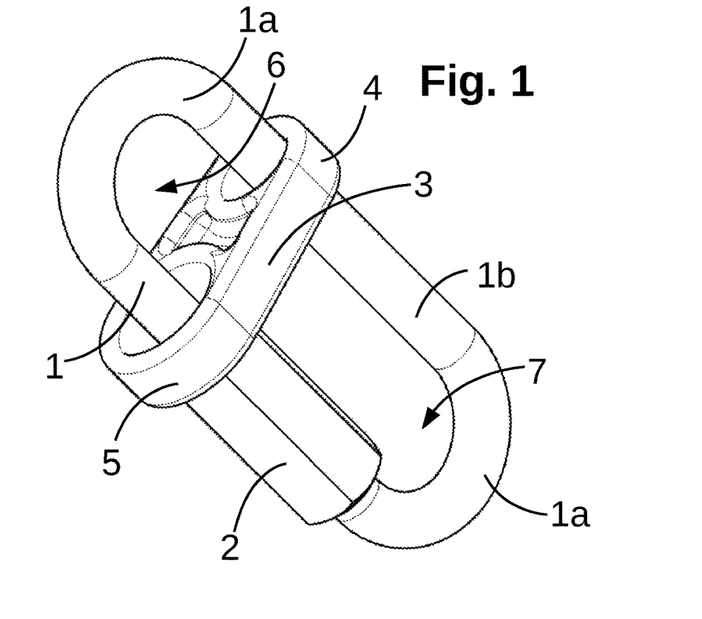
FIG. 1 illustrates a first embodiment of a closed quick link with the shutter in the blocking position, in schematic manner, in perspective view.
Figure 2:
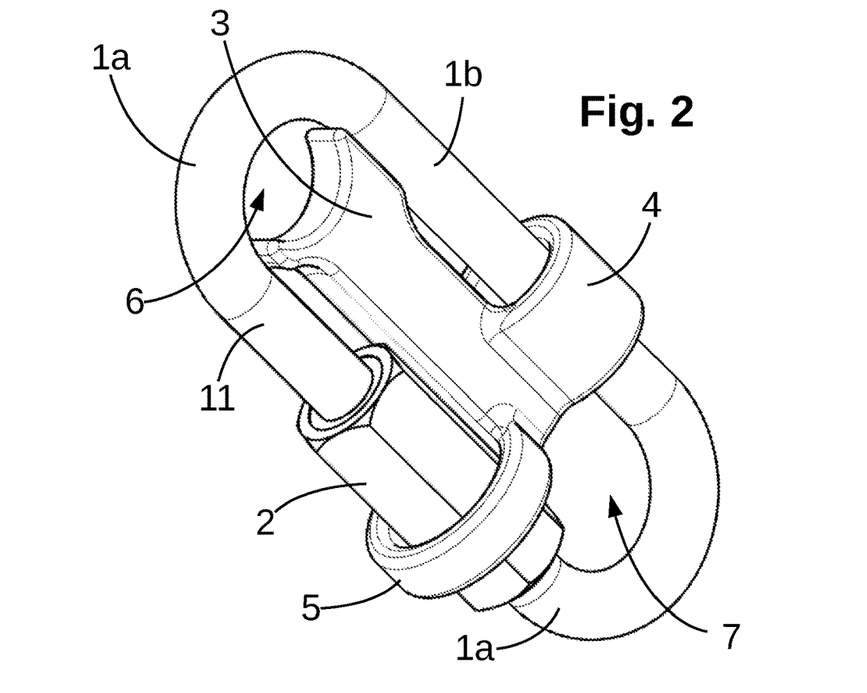
FIG. 2 illustrates a second embodiment of a closed quick link with the shutter in the blocking position, in schematic manner, in perspective view.
Figure 3:
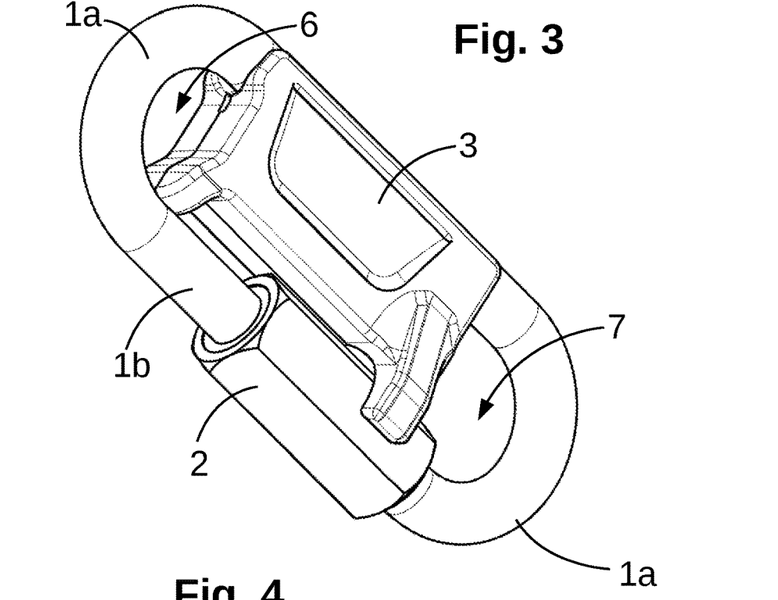
FIG. 3 illustrates a third embodiment of a closed quick link with the shutter in the blocking position, in schematic manner, in perspective view.

FIGS. 1, 2 and 3 illustrate three different embodiments of a quick link comprising a body 1 associated with a locking ring 2. Body 1 defines an open link provided with two distinct ends spaced apart from one another, at least one of the ends being associated with locking ring 2 to perform closing by a screw-fastening. Body 1 and locking ring 2 define a ring. The ring can be of any shape. FIGS. 1, 2 and 3 illustrate a ring having a substantially oval shape. However it is possible to have a ring having a substantially triangular shape.

The quick link comprises a plurality of curved portions 1a, for example two or three curved portions 1a connected by at least one central portion 1b, and an opening portion which defines the opening of the quick link.

In the embodiment illustrated in FIGS. 1, 2 and 3, the ring defines two straight facing portions connected by two rounded or curved 1a portions, for example two arcs of a circle. The distance separating the two rounded portions is greater than the distance separating the two straight sections. The quick link has a major axis connecting the two curved portions and a minor axis connecting the straight portion to the locking ring. Body 1 defines the two curved portions 1a and straight portion 1b.

Locking ring 2 is fitted movable with respect to body 1. Locking ring 2 slides along body 1 by screwing to open and close the ring. Locking ring 2 moves in a sliding direction. Body 1 and locking ring 2 form a closed ring when locking ring 2 is in the closed position. When locking ring 2 is in the open position, the quick link defines an open link. In the open position, the link is open with a predefined opening length. The opening length is measured in the sliding direction.

The quick link defines a median cross-section that is advantageously a plane of symmetry. In the median cross-section, the quick link defines a ring. The median cross-section separates a top surface and a bottom surface of the ring. The cross-section passes through the straight portion, the two curved portions and the locking ring. In advantageous manner, the curved portions are toroidal portions. The axis of revolution is advantageously perpendicular to the cutting plane.

Locking ring 2 has a thread that collaborates with a thread 1c of one end of body 1 to move ring 2 with respect to body 1 and lock the quick link in the closed position. Locking ring 2 has a non-circular external shape so as to operate in conjunction with a tool. The external cross-section section of locking ring 2 is larger than the external cross-section of the body. For example purposes, the external cross-section of locking ring 2 can be triangular, square, rectangular, hexagonal, octagonal or of another shape. Locking ring 2 is not pivoting to move towards or away from straight portion is 1b.

Operation of the quick link is very simple: the link being open (case of FIG. 5, 6, 7, 8, 9, 10, 11 or 13), ring 2 is slid to the threaded end of body 1 to close body 1 and define the closed ring as illustrated in FIGS. 1, 2 and 3. Ring 2 is rotated on itself, in one direction, so that the threads slide on one another to close and lock the quick link. The distance between locking ring 2 and straight portion 1b is constant, as the ring moves in translation and not by pivoting as in a karabiner which makes the inner part of the ring easier to use.

The link defines a straight portion enabling sliding of locking ring 2 between the open position and the closed position. The link can have other straight sections 1b formed entirely by body 1. A straight section can have a longitudinal axis that is parallel to the sliding direction of ring 2.

The quick link comprises a shutter 3 that is fitted removable with respect to body 1. Shutter 3 fills a part of the space located inside the ring. Shutter 3 comprises an attachment means 4 that is configured to secure shutter 3 with central portion 1b of body 1. Attachment means 4 collaborates with central section 1b of body 1 to allow rotation of shutter 3 around the longitudinal axis of central portion 1b. The attachment means is formed at one end of shutter 3.

Shutter 3 defines a ring configured to surround central portion 1b. The ring allows rotation of shutter 3 around central portion 1b. As an alternative, shutter 3 defines a hook around central portion 1b.

Shutter 3 also comprises a blocking system 5 in the form of a ring or a hook that operates in conjunction with locking ring 2 or the body in particular in the opening portion.

Blocking system 5 is configured so as to allow rotation of shutter 3 around central portion 1b when the quick link is open and to prevent rotation of shutter 3 around the central portion when the quick link is closed. In other words, locking ring 2 collaborates with blocking system 5 to prevent rotation of shutter 3 when locking ring 2 is in the closed position and to allow rotation of shutter 3 when locking ring 2 is in the open position. Shutter 3 is not configured to prevent rotation of locking ring 2 and to prevent movement of locking ring 2 in the sliding direction. In other words, when shutter 3 is fixed to body 1 and the quick link is closed, shutter 3 allows rotation of locking ring 2 and sliding of the latter to the open position.

Blocking system 5 has a smaller length than the opening length of the link so as to allow rotation of shutter 3 when locking ring 2 is in the open position. Shutter 3 can rotate around the central portion and pass through the opening. On the contrary, when locking ring 2 is in the closed position, locking ring 2 forms a stop preventing rotation.

Shutter 3 has two blocking members spaced apart from one another so as to allow insertion of locking ring 2 between the two blocking members. The two blocking members come up against the stop formed by ring 2 which prevents rotation. When ring 2 is in its closed position, it is impossible to remove shutter 3.

Shutter 3 is a rigid or sufficiently rigid part to prevent it from being deformed in order to be fixed to or detached from body 1.

Depending on the embodiments, blocking system 5 surrounds locking ring 2 partially or completely in a cutting plane perpendicular to the sliding direction to prevent rotation of shutter 3 with respect to body 1. Blocking system 5 can be formed by a ring with the two blocking members which converge as illustrated in FIGS. 1, 2 8, 9, 10, 11 and 12 or by a hook independently from the selected configuration to form attachment means 4 as illustrated in FIGS. 3, 4, 5, 6, 7, 13 and 14. The two salient parts forming the blocking members form part of the ring or of the hook.

In its blocking position, shutter 3 is in contact with central portion 1b and is also in contact with locking ring 2. Shutter 3 connects central section 1b with locking ring 2 defining two dissociated areas 6 and 7 in the inner part of the ring. The two dissociated zones 6 and 7 are separated by shutter 3 which complicates movement of the quick link under a load. Shutter 3 also prevents the two parts initially installed on the two curved sections of the ring, i.e. in areas 6 and 7, from coming into contact.

Blocking systems of a triangular connector fitted swivelling on the body are known (PETZL DELTA). Swivelling of the blocking system results in movement between a position allowing opening of the connector and a position preventing opening of the connector. This configuration is however not advantageous as, in use, the blocking system is stressed which may result in swivelling of the latter from the blocking position to the position allowing opening. Once this position has been reached, the blocking system becomes inefficient. The connector can rotate and the blocking system which is salient is quickly broken or detached.

In the different illustrated embodiments, removal of shutter 3 is only possible when locking ring 2 is in the open position. Movement of locking ring 2 eliminates the blocking point procured by locking ring 2 on blocking members 5 allowing rotation of shutter 3 followed by detachment of the latter from body 1 for example by sliding of shutter 3 along body 1 to reach the free gap between the two ends of body 1.

Figure 7:
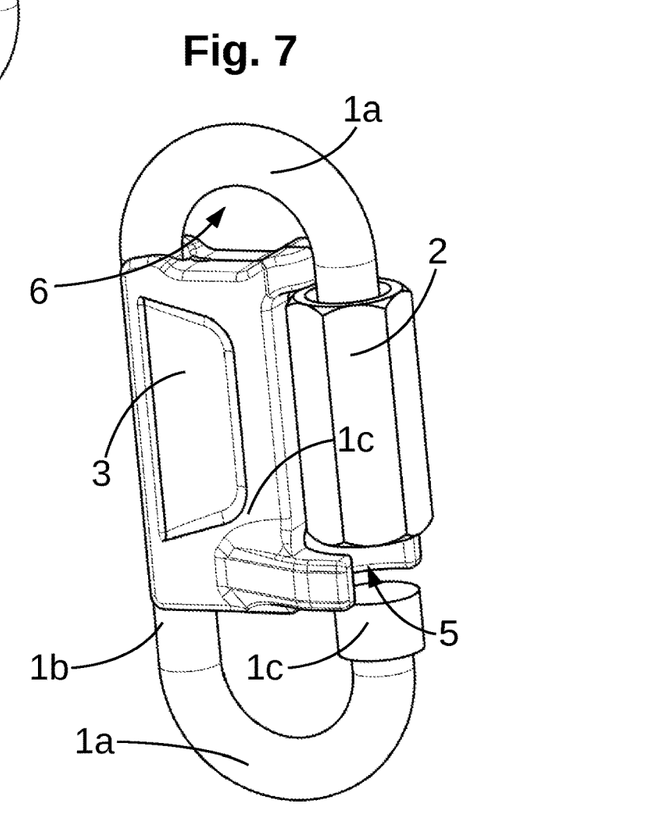
FIG. 7 illustrates a third fitting step of a shutter according to FIG. 4 in the quick link, in schematic manner, in perspective view, the shutter being fixed to the body in the straight portion and turned so as to be facing the locking ring.

As illustrated in FIGS. 1 and 2, this solution can be achieved using a shutter 3 that defines two separate rings respectively surrounding straight section 1b and locking ring 2 in the closed position. It is also possible to obtain such a result using a ring associated with a hook or by using two hooks as illustrated in FIGS. 3 and 7. The opening areas of the hooks are arranged to prevent rotation, for example by arranging the opening areas of the hooks so as to leave the outer part of the straight portion and the outer part of the locking ring free. The hooks are not configured as clips. The hooks can be formed from a sufficiently rigid material to prevent deformation and to only allow insertion of the locking ring in the sliding direction. It is also possible to provide for the free area of the hook to be incompatible with clipping by swivelling.

In a configuration with two hooks collaborating with central portion 1b and locking ring 2, as illustrated in FIGS. 3 to 7, the two hooks are advantageously configured so as not to cover the outer wall of the ring and to cover the rest of the section of central portion 1b and of locking ring. It is more advantageous to use a blocking system 5 in the form of a hook than in the form of a ring as the user has a better view of closing of the quick link which is a guarantee of safety.

In a particular embodiment illustrated in FIGS. 8 to 11, shutter 3 defines two distinct rings. The first ring surrounds central section 1b of body 1 and the second ring surrounds locking ring 2. Shutter 3 can move in the translation direction of ring 2 when ring 2 is in the closed position.

In advantageous manner, the first ring defines an aperture having a smaller cross-section than the cross-section of the second ring so that insertion of locking ring 2 in the first ring is impossible. The cross-section of the first ring allows insertion of body 1.

The two rings allow shutter 3 to move in the translation direction. What is presented for two rings is also applicable for one ring and one or two hooks. One of the hooks can pass around the body without being able to pass around locking ring 2.

In advantageous manner, shutter 3 has a rod arranged between the two rings/hooks and directed towards one of the curved portions of the body. The rod enables section 6 or section 7 to be limited thereby limiting the possibility of movement of the items and tools in the ring. It is then more difficult for the quick link to rotate and turn around. It is more difficult to make the quick link work other than along its major axis.

In a particular embodiment, the length of blocking member 5 is smaller than the length of the locking ring in the sliding direction. This configuration results in actuation of ring 2 not being hampered.

In advantageous manner, shutter 3 is configured so that a curved part of body 1 forms a stop blocking shutter 3 around the locking ring. Preferentially, the shape of shutter 3 is chosen to collaborate with body 1 so that blocking system 5 is always in contact with the locking ring when the ring is closed.

In advantageous manner, the length of the blocking member in the sliding direction corresponds to at least 50% of the distance separating the two ends of the body, preferentially at least 75% so as to have complete or almost complete opening of the link to be able to remove blocking member 5 easily.

Preferentially, the length of shutter 3 in the sliding direction is at least equal to 50% of the length of the major axis of the link.

Figure 4:
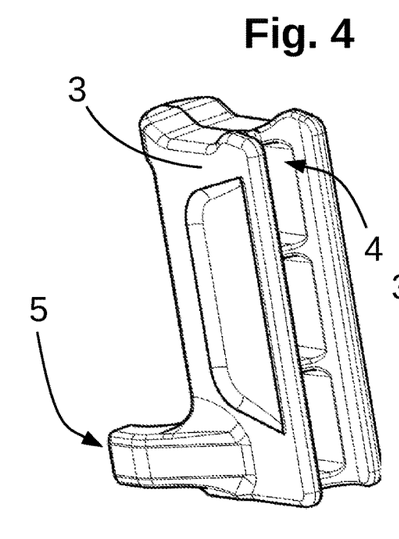
FIG. 4 illustrates a shutter, in schematic manner, in perspective view.
Figure 5:
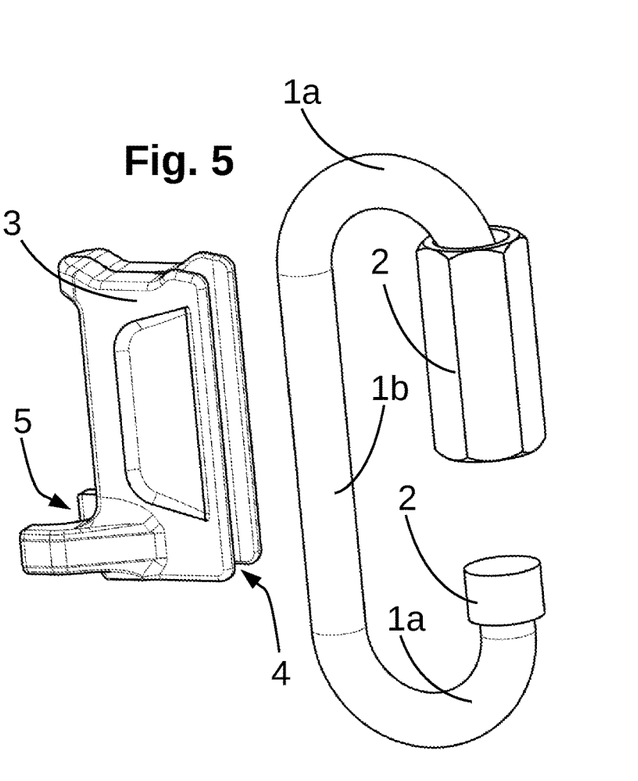
FIG. 5 illustrates a first fitting step of a shutter according to FIG. 4 on a quick link, in schematic manner, in perspective view.

FIG. 4 illustrates an embodiment of a shutter 3 provided with two hooks defining attachment means 4 and blocking system 5. In the illustrated example, attachment means 4 is in the form of a groove. The attachment means can be fitted on the body by clipping, i.e. by slight deformation of the shutter as illustrated in FIG. 5.

Figure 6:
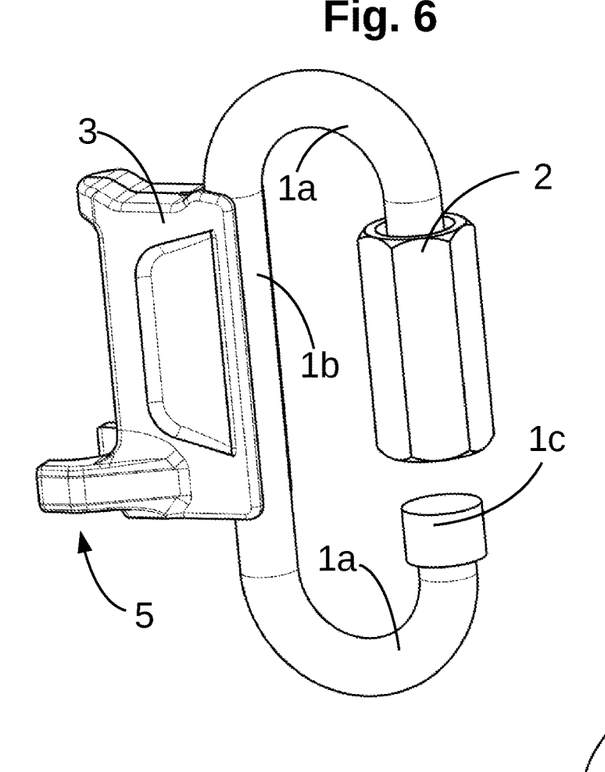
FIG. 6 illustrates a second fitting step of a shutter according to FIG. 4 on a quick link, in schematic manner, in perspective view, the shutter being fixed to the body in the straight portion.

Shutter 3 is fixed to central part 1b which enables it to rotate. As illustrated in FIG. 6, the locking ring is in its open position enabling rotation of shutter 3 with respect to the body. The rotation can be complete, i.e. through 360°.

As illustrated in FIG. 7, the shutter is turned so that ring 2 is located between the two blocking members in the extension of the sliding axis. Once shutter 3 has been fitted, locking ring 2 is screwed tight to close the quick link preventing removal of shutter 3. When the link is closed, shutter 3 can move in translation in the sliding direction and possibly in rotation depending on the functional clearance defined by the blocking system with respect to body 1 or to locking ring 2.

Figure 8:
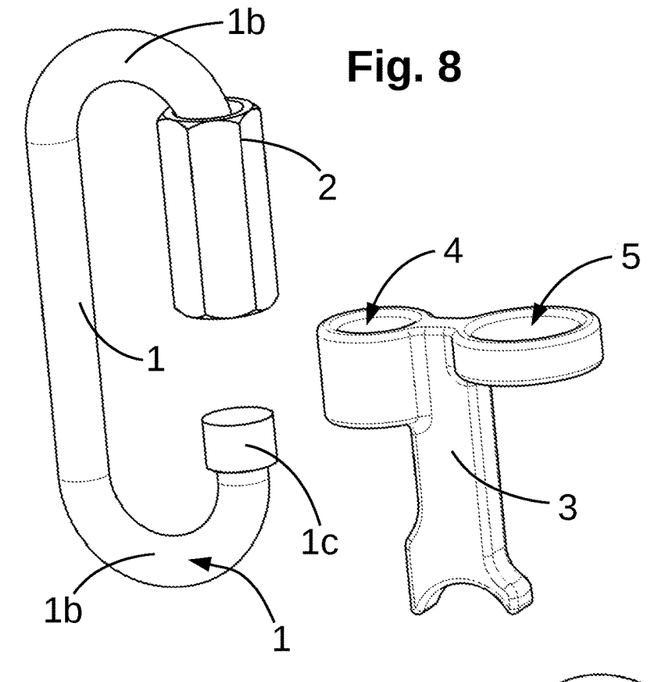
FIG. 8 illustrates a first fitting step of a second configuration of a shutter on a quick link, in schematic manner, in perspective view.

FIGS. 8, 9, 10 and 11 represent different steps of fitting of shutter 3 on body 1. FIG. 8 illustrates a body 1 dissociated from shutter 3. Locking ring 2 is in its open position.

Figure 9:
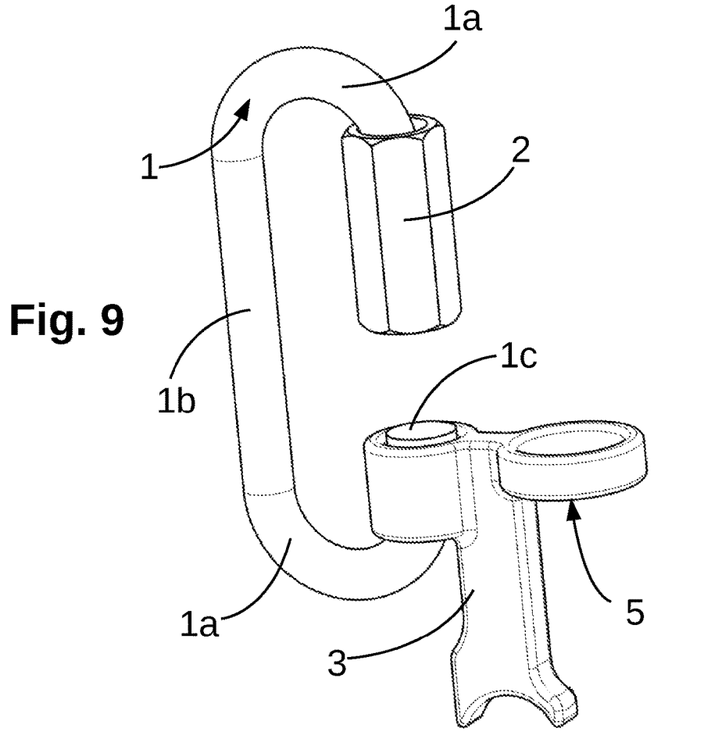
FIG. 9 illustrates a second fitting step of the second configuration of a shutter on a quick link, in schematic manner, in perspective view, the shutter being fitted on one end of the body.
Figure 10:
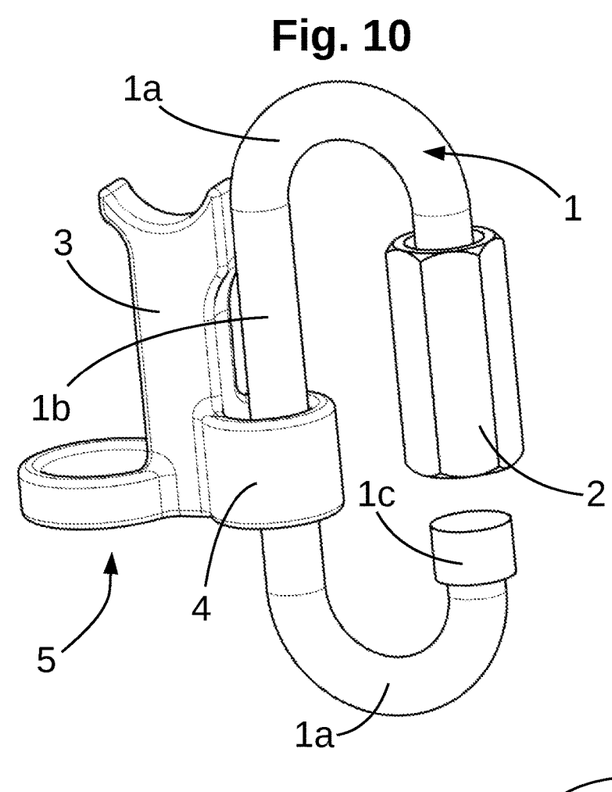
FIG. 10 illustrates a third fitting step of the second configuration of a shutter on a quick link, in schematic manner, in perspective view, the shutter being fitted in the straight portion of the body.
Figure 11:
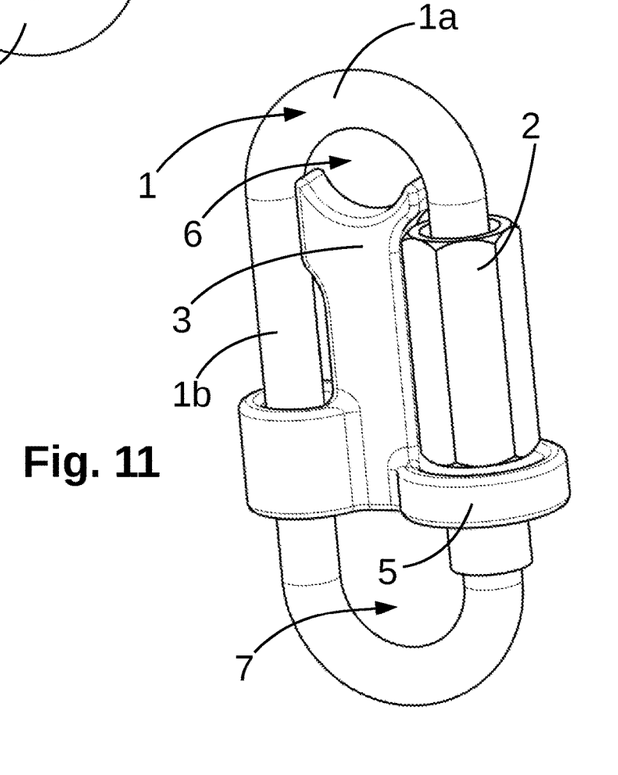
FIG. 11 illustrates, a fourth fitting step of the second configuration of a shutter on a quick link, in schematic manner, in perspective view, the shutter being fixed to the body in the straight portion and turned so as to be facing the locking ring.
Figure 12:
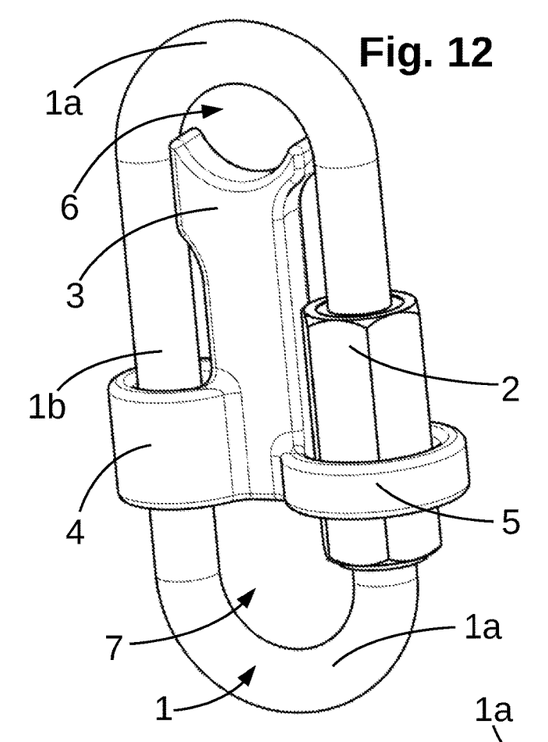
FIG. 12 illustrates a fifth fitting step where the link is closed, in schematic manner, in perspective view.

FIG. 9 illustrates fitting of the attachment means on one end of body 1. Then, as illustrated in FIG. 10, shutter 3 slides along body 1 so as to install the blocking member of blocking system 5 facing the space separating the two ends of body 1 perpendicularly to the sliding direction of ring 2. Shutter 3 moves in rotation so as to place the blocking member of blocking system 5 in the extension of the end of body 1 which secures locking ring 2 and in the sliding direction (FIG. 11). Once shutter 3 has been fitted, locking ring 2 is moved so as to close the quick link (FIG. 2). Locking ring 2 passes through the blocking member of blocking system 5 preventing rotation of shutter 3 around the straight portion of body 1.

In an illustrated embodiment, shutter 3 defines an end-of-travel stop limiting movement of locking ring 2.

When attachment means 4 is in the form of a ring, ring 4 and at least one of the curved portions 1a are configured to allow sliding of ring 4 from opening of body 1 up to straight portion 1b.

Figure 13:
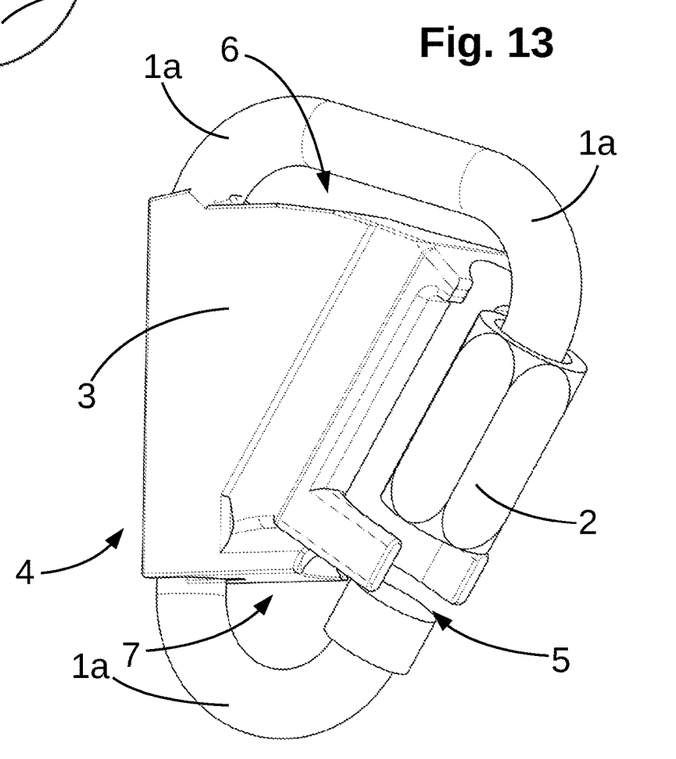
FIG. 13 illustrates a fitting step of a third configuration of a shutter on a triangular quick link, in schematic manner, in perspective view.
Figure 14:
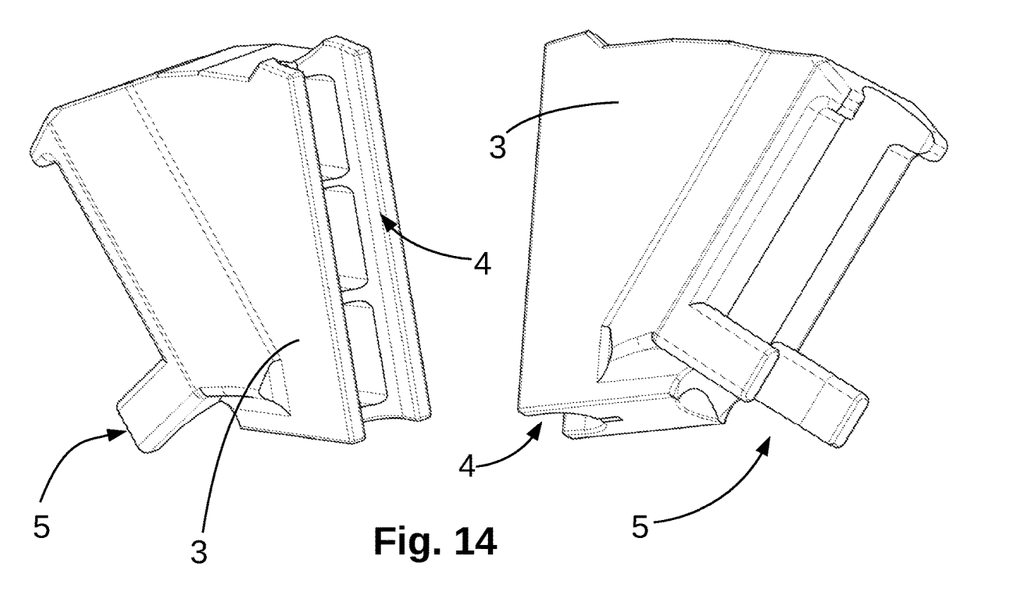
FIG. 14 illustrates the third configuration of shutter illustrated in FIG. 13, in schematic manner, in perspective view.

FIGS. 13 and 14 illustrate another embodiment with a quick link in the form of a triangle. The shape of shutter 3 is adjusted to the shape of the link so as to be able to be fitted on body 1 and so that the blocking member of blocking system 5 can operate in conjunction with ring 2. Operation of this embodiment is identical to that illustrated in FIGS. 4 to 7. FIG. 14 represents the two opposite surfaces of shutter 3 with two hooks, one of which is in the form of a groove, defining attachment means 4 and blocking system 5.

The invention claimed is:

1. A quick link comprising:
   a body defining an open link with opposite first and second ends, the body comprising a central portion separating two curved portions, one of the first and second ends comprising a thread;
   a locking ring fitted rotating and sliding with respect to the body, the locking ring defining a closed position connecting the opposite first and second ends of the body to close the quick link and an open position in which the locking ring is separated from the first end of the body to define an open link with an opening length measured along the sliding axis of the locking ring, the locking ring comprising a thread collaborating with the thread of the one of the first and second ends, the locking ring sliding along the body by screwing to open and close the quick link;
   a shutter fitted removable with respect to the body, the shutter having a first end fixed to the central portion by a first fastener formed by a first hook or a first ring and having an opposite second end collaborating with the locking ring or with the body by means of a second fastener formed by a second hook or a second ring, the first fastener allowing rotation of the shutter with respect to the body, the second fastener collaborating with the body and/or the locking ring to prevent said rotation;
   wherein the second fastener has a length smaller than the opening length along the sliding axis to allow rotation of the shutter between the locking ring and the first end of the body when the locking ring is in the open position and two blocking members spaced apart from one another to form stops preventing rotation of the shutter when the locking ring is in the closed position;
   wherein a distance between the first fastener and the second fastener is constant; and
   wherein the body defines an opening and the second fastener is able to pass through the opening when the shutter rotates around the central portion of the body and when the locking ring is in the open position.

2. The quick link according to claim 1, wherein the second fastener and first fastener are both formed by a ring.

3. The quick link according to claim 2, wherein the shutter defines a first ring having a section allowing insertion of the body and preventing insertion of the locking ring and a second ring allowing insertion of the locking ring.

4. The quick link according to claim 1, wherein the second fastener and the first fastener are both formed by a hook.

5. The quick link according to claim 1, wherein the shutter is fitted movable in translation in the sliding direction of the locking ring.

6. The quick link according to claim 1, wherein the second fastener partially covers the locking ring in the sliding direction of the locking ring.

7. The quick link according to claim 1, wherein the shutter has a rod directed towards one of the curved portions of the body and salient from the attachment means and from the second fastener.

8. The quick link according to claim 1, wherein the shutter defines a block stop configured to prevent movement of the locking ring in the sliding direction, the block stop being arranged between the first fastener and the second fastener and extending parallel to the sliding axis.

9. The quick link according to claim 1, wherein one of the first fastener and the second fastener is formed by a hook, and the other of the first fastener and the second fastener is formed by a ring.

10. A quick link comprising:
    a body defining an open link with opposite first and second ends, the body comprising a central portion separating two curved portions, one of the first and second ends comprising a thread;
    a locking ring fitted rotating and sliding with respect to the body, the locking ring defining a closed position connecting the opposite first and second ends of the body to close the quick link and an open position in which the locking ring is separated from the first end of the body to define an open link with an opening length measured along the sliding axis of the locking ring;
    a shutter fitted removable with respect to the body, the shutter having a first end fixed to the central portion by a first fastener formed by a first ring and having an opposite second end collaborating with the locking ring or with the body by means of a second fastener formed by a second ring, the first fastener allowing rotation of the shutter with respect to the body, the second fastener collaborating with the body and/or the locking ring to prevent said rotation;
    wherein the second fastener has a length smaller than the opening length along the sliding axis to allow rotation of the shutter between the locking ring and the first end of the body when the locking ring is in the open position and two blocking members spaced apart from one another to form stops preventing rotation of the shutter when the locking ring is in the closed position.

11. A quick link comprising:
    a body defining an open link with opposite first and second ends, the body comprising a central portion separating two curved portions, one of the first and second ends comprising a thread;
    a locking ring fitted rotating and sliding with respect to the body, the locking ring defining a closed position connecting the opposite first and second ends of the body to close the quick link and an open position in which the locking ring is separated from the first end of the body to define an open link with an opening length measured along the sliding axis of the locking ring, the locking ring comprising a thread collaborating with the thread of the one of the first and second ends, the locking ring sliding along the body by screwing to open and close the quick link;

a shutter fitted removable with respect to the body, the shutter having a first end fixed to the central portion by a first fastener formed by a first hook or a first ring and having an opposite second end collaborating with the locking ring or with the body by means of a second fastener formed by a second hook or a second ring, the first fastener allowing rotation of the shutter with respect to the body, the second fastener collaborating with the body and/or the locking ring to prevent said rotation;

wherein the second fastener has a length smaller than the opening length along the sliding axis to allow rotation of the shutter between the locking ring and the first end of the body when the locking ring is in the open position and two blocking members spaced apart from one another to form stops preventing rotation of the shutter when the locking ring is in the closed position; and wherein the shutter is mounted sliding when the first fastener fixes the shutter to the body and when the second fastener fixes the shutter to the locking ring in the closed position; and wherein the body defines an opening and the second fastener is able to pass through the opening when the shutter rotates around the central portion of the body and when the locking ring is in the open position.

* * * * *